(12) United States Patent
Ko et al.

(10) Patent No.: US 11,215,690 B2
(45) Date of Patent: Jan. 4, 2022

(54) OBJECT LOCATION MEASUREMENT METHOD AND AUGMENTED REALITY SERVICE PROVIDING DEVICE USING THE SAME

(71) Applicant: AJOU UNIVERSITY INDUSTRY-ACADEMIC COOPERATION FOUNDATION, Suwon-si (KR)

(72) Inventors: Young-Bae Ko, Suwon-si (KR); Hong Beom Choi, Seongnam-si (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 0 days.

(21) Appl. No.: 17/148,696

(22) Filed: Jan. 14, 2021

(65) Prior Publication Data

US 2021/0349175 A1    Nov. 11, 2021

(30) Foreign Application Priority Data

May 11, 2020  (KR) ......................... 10-2020-0055912

(51) Int. Cl.
*G09G 5/00* (2006.01)
*G01S 5/02* (2010.01)
(Continued)

(52) U.S. Cl.
CPC ............ *G01S 5/02585* (2020.05); *G06T 7/70* (2017.01); *G06T 19/006* (2013.01); *G16Y 10/75* (2020.01)

(58) Field of Classification Search
CPC .................................................. G06T 19/006
See application file for complete search history.

(56) References Cited

U.S. PATENT DOCUMENTS

2016/0239080 A1* 8/2016 Marcolina ............... G06F 1/163
2018/0130260 A1* 5/2018 Schmirler ............. G06T 19/006
(Continued)

FOREIGN PATENT DOCUMENTS

KR    10-2013-0020295 A    2/2013
KR    10-2014-0110584 A    9/2014
(Continued)

OTHER PUBLICATIONS

Kim, Gi-Hong et al.; "Mobile Mixed Reality Technology", Electronics and Telecommunications Trends, Electronics and Telecommunications Research Institute, 2007, vol. 22, Issue 4 Serial No. 106, pp. 96-108.
(Continued)

*Primary Examiner* — Charles Tseng
(74) *Attorney, Agent, or Firm* — Sughrue Mion, PLLC

(57) ABSTRACT

The present invention provides an augmented reality service providing device, including: a sensing unit to photograph an object and to measure a current position of a mobile terminal; a communication unit to measure a communication distance between the mobile terminal and the object; a control unit to control to repeat a plurality of times the measurement of the current position and the communication distance while the mobile terminal is moving; a calculation unit to calculate an estimated position of the object based on the current position and the communication distance measured repeatedly a plurality of times; and a display unit to display virtual information on the object on the estimated position of the object.

12 Claims, 2 Drawing Sheets

(51) Int. Cl.
　　　*G06T 19/00*　　　(2011.01)
　　　*G06T 7/70*　　　(2017.01)
　　　*G16Y 10/75*　　　(2020.01)

(56) References Cited

U.S. PATENT DOCUMENTS

| | | | |
|---|---|---|---|
| 2018/0204385 A1* | 7/2018 | Sarangdhar | G08C 17/02 |
| 2019/0253580 A1* | 8/2019 | Kodimer | H04N 1/00973 |
| 2020/0201513 A1* | 6/2020 | Malmed | G06K 7/10099 |

FOREIGN PATENT DOCUMENTS

| | | |
|---|---|---|
| KR | 10-2015-0087955 A | 7/2015 |
| KR | 10-2016-0109828 A | 9/2016 |
| KR | 10-2018-0089907 A | 8/2018 |

OTHER PUBLICATIONS

Hong-Beom Choi et al., "Poster:Sensor Localization System for AR-assisted Disaster Relief Applications", MobiSys '19, Jun. 17-21, 2019, Seoul, Korea, pp. 526-527.

* cited by examiner

OBJECT LOCATION MEASUREMENT METHOD AND AUGMENTED REALITY SERVICE PROVIDING DEVICE USING THE SAME

CROSS-REFERENCE TO RELATED APPLICATION

This application claims priority to and the benefit of Korean Patent Application No. 10-2020-0055912, filed on May 11, 2020, the disclosure of which is incorporated herein by reference in its entirety.

BACKGROUND

1. Field of the Invention

The present invention relates to an object location measurement method and augmented reality service providing device using the same.

2. Discussion of Related Art

Terminal may be sorted into a mobile/portable terminal and a stationary terminal depending on whether they can be moved. Further, the mobile terminal may be sorted into a handheld terminal and a vehicle mount terminal depending on whether a user can directly carry them.

Such terminals have been embodied in the form of a multimedia with complex functions such as taking pictures or videos, playing music or video files, gaming and receiving broadcasts as their functions are diversified.

Recently, a technology for implementing augmented reality on the screen of a terminal has been commercialized. Here, the augmented reality (AR) is a state that shows a single image combining a virtual image with a real image and is also referred to as mixed reality (MR).

For example, when a user photographs a building or sculpture using a smartphone in an outdoor space, an image of the building or sculpture is displayed on the screen of the smartphone and information about the building or sculpture recognized by the smartphone is also displayed at the same time.

In order to implement augmented reality on the terminal screen, it is necessary to identify the location of the object. That is, in the example described above, it is necessary to identify the location of the building or sculpture that is a real image.

In order to grasp the location of an object in this way, in an outdoor space it is common to implement based on the relative locations of objects calculated using a Global Navigation Satellite System (GNSS), and in an indoor or small space it is common to implement using indoor positioning technology or camera vision-based methods since GNSS may not be used.

Until now, various ideas have been proposed to utilize an augmented reality application as one of the user interfaces of the Internet of Things (IoT). Representatively, these include the vision-based marker method, which is a method of acquiring the ID of the sensor using QR Code and displaying information obtained from the server using this, and a method of calculating a relative position by using a position of previously input objects and a position of a device.

However, these methods have limitations in being used in applications running in actual mobile terminals due to their labor-intensive characteristics, limitations in computing requirements and so on, or in terms of accuracy. Therefore, there is a need for a technology for measuring the relative position of an object in augmented reality that can provide more than a certain level of accuracy without requiring pre-installation or spatial learning and so on.

The above information disclosed in this Background section is only for enhancement of understanding of the background of the invention and it may therefore contain information that does not form the prior art that is already known to a person of ordinary skill in the art.

SUMMARY OF THE INVENTION

The present invention is directed to providing an augmented reality service by calculating a position of an object with more than a certain level of accuracy.

The technical problems to be achieved in the present invention are not limited to the technical problems mentioned above, and other technical problems not mentioned will be clearly understood by those of ordinary skill in the art from the following description.

The present invention provides an augmented reality service providing device, including: a sensing unit to photograph an object and to measure a current position of a mobile terminal, a communication unit to measure a communication distance between the mobile terminal and the object, a control unit to control to repeat multiple times the measurement of the current position and the communication distance while the mobile terminal is moving, a calculation unit to calculate an estimated position of the object based on the current position and the communication distance measured repeatedly a plurality of times, and a display unit to display virtual information on the object on the estimated position of the object.

Here, the sensing unit includes a camera and an inertial measurement unit, and measures the current position of the mobile terminal through Visual Inertial Odometry (VIO).

In addition, the communication unit measures the communication distance by using an intensity of a receiving signal received from the object or a time of flight between the mobile terminal and the object.

In addition, the calculation unit calculates the estimated position of the object using the multilateration method.

In addition, the communication unit receives the virtual information from the object and transmits a control signal for controlling the object to the object. In addition, the control unit labels the estimated position of the object on the virtual information.

In addition, the augmented reality service providing device according to an embodiment of the present invention further includes an input unit for a user to control the object.

In addition, the control unit generates a control signal according to the user's input.

In addition, the present invention provides an object location measurement method to visualize the object in augmented reality, including: measuring a current position of a mobile terminal and a communication distance between the mobile terminal and an object, repeating a plurality of times the measurement of the current position and the communication distance while the mobile terminal is moving, and calculating an estimated position of the object based on the current position and the communication distance measured repeatedly a plurality of times.

Here, the measuring the current position of the mobile terminal is performed through VIO (Visual Inertial Odometry).

In addition, the measuring the communication distance between the mobile terminal and the object is performed by measuring the communication distance based on an intensity of a receiving signal received from the object.

In addition, the calculating the estimated position of the object is performed by calculating the estimated position of the object using the multilateration method.

According to the present invention, even if the position of the object is not entered in advance or indoor spatial learning and so on is not done, the augmented reality service may be provided by calculating the position of the object more than a certain level of accuracy.

In addition, according to the present invention, it may be possible to interact with the object through augmented reality, thereby providing an intuitive and efficient user experience to users.

In addition, according to the present invention, it may be possible to label the estimated position of the object on the virtual information of the object, and through this, it may be used in various application fields such as indoor navigation, initial response to disasters including fire, and finding lost items.

The effects of the present invention are not limited to those mentioned above, and other effects not mentioned will be clearly understood by those of ordinary skill in the art from the following description.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF EXAMPLE EMBODIMENTS

Figure 1:
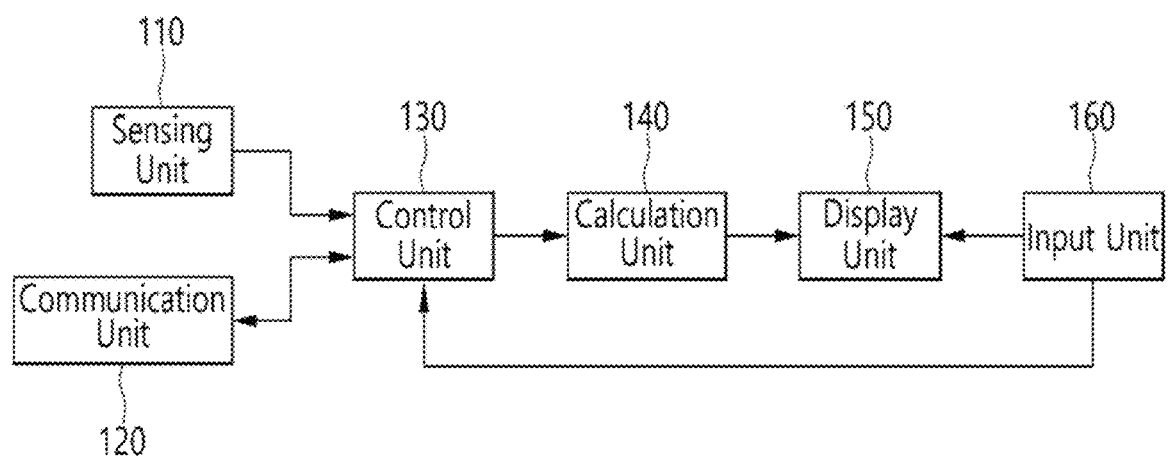
FIG. 1 is a block diagram of an augmented reality service providing device according to an exemplary embodiment of the present invention.

Terms or words used in the present specification and claims should not be construed as limited to their usual or dictionary definition, and they should be interpreted as a meaning and concept consistent with the technical idea of the present invention based on the principle that inventors may appropriately define the concept of terms in order to describe their own invention in the best way.

Accordingly, the embodiments described in the present specification and the configurations shown in the drawings are only the most preferred embodiments of the present invention, and do not represent all the technical spirit of the present invention, so it should be understood that there may be various examples of equivalent and modification that can replace them at the time of filing the present invention.

Hereinafter, exemplary embodiments of the present invention will be described in detail so that those of ordinary skill in the art can readily implement the present invention with reference to the accompanying drawings.

FIG. 1 is a block diagram of an augmented reality service providing device according to an exemplary embodiment of the present invention and FTG. 2 is an exemplary diagram for describing operations of an augmented reality service providing device according to an exemplary embodiment of the present invention.

Figure 2:
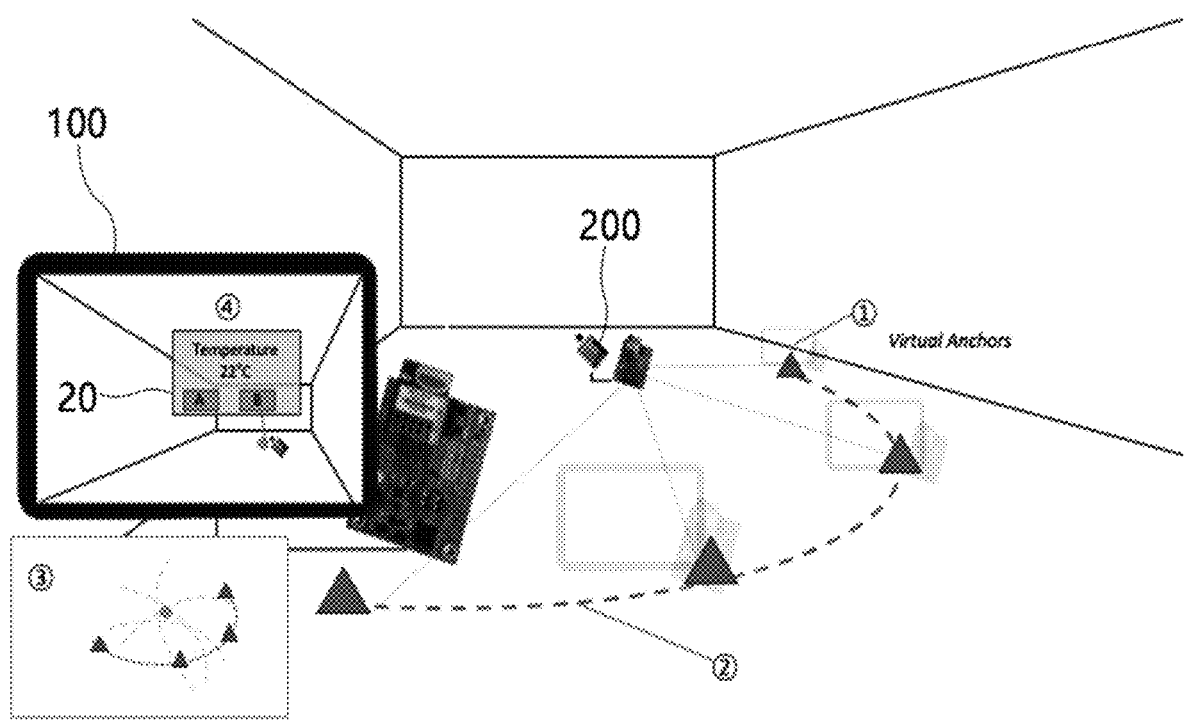
FIG. 2 is an exemplary diagram for describing operations of an augmented reality service providing device according to an exemplary embodiment of the present invention.

Hereinafter, an augmented reality service providing device according to an embodiment of the present invention will be described in detail with reference to FIGS. 1 and 2.

The augmented reality service providing device according to an embodiment of the present invention may include a sensing unit 110, a communication unit 120, a control unit 130, a calculation unit 140, a display unit 150, and an input unit 160. In this way, the augmented reality service providing device may be embodied as a mobile terminal 100. That is, the mobile terminal 100 may provide an augmented reality service by installing an augmented reality application therein and executing the augmented reality application.

The mobile terminal 100 may include a mobile phone, a smartphone, a laptop computer, a digital broadcasting terminal, a personal digital assistant (PDA), a portable multimedia player (PMP), and a navigation device.

The augmented reality (AR) is a state that shows a single image combining a virtual image with a real image and is also referred to as mixed reality (MR). In an embodiment of the present invention, the mobile terminal 100 implements the augmented reality by projecting an object 200 with its own camera so that virtual information 20 on the object 200 and the object 200 that is a real image are combined and displayed as a single image.

The object 200 may be a variety of sensors or Internet of Things (IoT) devices, and may be fixed to a predetermined position in an indoor space. Here, the Internet of Things refers to intelligent technologies and services that connect various things through a network such as the Internet so that information between people and things and between things and things can be communicated with each other. In addition, a device connected to such a IoT is referred to as an IoT device.

According to an embodiment of the present invention, the mobile terminal 100 may illuminate a temperature sensor with its own camera, receive temperature information from the temperature sensor, generate virtual temperature information using the information, and display it at a position of the temperature sensor, which is a real image.

In this way, in order to display the virtual information 20 on the position of the object 200 which is a real image, the position of the object 200 must be measured.

Meanwhile, in an outdoor space, the position of the object 200 can be measured relatively accurately using a Global Navigation Satellite System (GNSS), but if the object 200 is located in an indoor space as in the present invention, the position information of the object 200 cannot be obtained using the above GNSS.

Accordingly, the augmented reality service providing device according to an embodiment of the present invention estimates the position of the object 200 in an indoor space based on a current position of the mobile terminal 100 and a communication distance between the mobile terminal 100 and the object 200.

The sensing unit 110 photographs the object 200 and measures the current position of the mobile terminal 100. Specifically, the sensing unit 110 includes a camera and an inertial measurement unit, and measures the current position of the mobile terminal 100 through Visual Inertial Odometry (VIO).

Here, VIO is a technology that relatively accurately measures the current position of the mobile terminal 100 by analyzing an image captured by the camera and an inertia value measured by the inertial measurement unit, and is a technology widely used in the fields of augmented reality application and autonomous driving robot.

In the meantime, the camera processes image frames such as still images or moving images obtained by an image sensor in the photographing mode. The processed image frames may be displayed on the display unit 150. In addition, the image frames processed in the camera may be stored in a memory or transmitted to the outside through the communication unit 120. Two or more such cameras may be provided depending on the usage environment.

The communication unit 120 may perform wireless communication with an Internet service providing server and an augmented reality service providing server. Such wireless communication technologies may include, but not limited to, WLAN (Wireless LAN) (Wi-Fi), WiBro (Wireless broadband), WiMax (World Interoperability for Microwave Access), HSDPA (High Speed Downlink Packet Access), GPRS (General Packet Radio Service), CDMA, WCDMA, LTE (Long Term Evolution).

In addition, the communication unit 120 may perform short-range communication with the object 200. Such short-range communication technologies may include Bluetooth, Radio Frequency Identification (RFID), infrared data association (IrDA), ultra-wideband (UWB), ZigBee.

In addition, the communication unit 120 measures a communication distance between the mobile terminal 100 and the object 200. Specifically, the communication unit 120 performs communication with the object 200 to receive an identifier (ID) of the object 200 and sensing information sensed by the object 200, and measures the communication distance between the mobile terminal 100 and the object 200 by using an intensity of a receiving signal received from the object 200 or a time of flight between the mobile terminal 100 and the object 200.

Of course, it is obvious that the object 200 is also provided with a communication unit that performs a communication function and a communication distance measurement function.

The control unit 130 controls to repeat a plurality of times the measurement of the current position of the mobile terminal 100 and the communication distance between the mobile terminal 100 and the object 200 while the mobile terminal 100 is moving.

Specifically, when the mobile terminal 100 moves in an indoor space in which the object 200 is located, the control unit 130 generates a plurality of virtual anchors for each predetermined moving distance. Here, the virtual anchor is a node at the current location of the mobile terminal 100 and is a reference node for measuring a communication distance between the mobile terminal 100 and the object 200.

At a plurality of virtual anchors whose positions change as the mobile terminal 100 moves, the control unit 130 controls the sensing unit 110 to measure the current position of the mobile terminal 100, and controls the communication unit 120 to measure the communication distance between the mobile terminal 100 and the object 200.

The calculation unit 140 calculates an estimated position of the object 200 based on the current position of the mobile terminal 100 and the communication distance between the mobile terminal 100 and the object 200, measured repeatedly a plurality of times.

Here, the calculation unit 140 may calculate the estimated position of the object 200 using the multilateration method.

The estimated position of the object 200 is not an absolute position, but a relative position with respect to the mobile terminal 100.

In addition, the estimated position of the object 200 may be expressed in 2D position coordinates (x, y) and 3D position coordinates (x, y, z). In the case of 2D position coordinates, the current position of the mobile terminal 100 and the communication distance between the mobile terminal 100 and the object 200 must be measured at three virtual anchors, and in the case of 3D position coordinates, the current position of the mobile terminal 100 and the communication distance between the mobile terminal 100 and the object 200 must be measured at four virtual anchors.

That is, in order to calculate the 2D position coordinates, it requires an equation of three circles in which the current position of the mobile terminal 100 is the center and the communication distance between the mobile terminal 100 and the object 200 is a radius, and in order to calculate the 3D position coordinates, it requires an equation of four circles in which the current position of the mobile terminal 100 is the center and the communication distance between the mobile terminal 100 and the object 200 is a radius. In this case, a point where three or four circles intersect is the estimated position of the object 200.

Hereinafter, a method of calculating the 3D position coordinates (x, y, z) of the object 200 using the multilateration method will be described, but the 2D position coordinates may also be calculated by the same method.

At the four virtual anchors, the calculation unit 140 calculates the equation of four circles in which the current position of the mobile terminal 100 is the center and the communication distance between the mobile terminal 100 and the object 200 is a radius, as shown in the equation 1 below:

$$(x_1-x)^2+(y_1-y)^2+(z_1-z)^2=d_1$$
$$(x_2-x)^2+(y_2-y)^2+(z_2-z)^2=d_2$$
$$(x_3-x)^2+(y_3-y)^2+(z_3-z)^2=d_3$$
$$(x_4-x)^2+(y_4-y)^2+(z_4-z)^2=d_4 \quad \text{[Equation 1]}$$

Here, $x_i$, $y_i$ and $z_i$ (wherein i is 1, 2, 3, 4) are the 3D position coordinates of a virtual anchor whose position changes, and $d_1$, $d_2$, $d_3$, and $d_4$ are the communication distance between the virtual anchor and the object 200.

In this way, when four equations defined in Equation 1 are solved simultaneously, the 3D position coordinates (x, y, z) of the object 200 can be calculated.

Then, the display unit 150 displays virtual information 20 on the object 200 at the estimated position of the object 200. Specifically, when the camera illuminates the object 200, the communication unit 120 receives the virtual information 20 on the object 200 from the object 200, and the received virtual information 20 and the object 200 that is a real image are combined and displayed as a single image by the display unit 150.

Meanwhile, the display unit 150 displays information processed by the mobile terminal 100. For example, when the mobile terminal 100 is in a call mode, the display unit 150 displays a user interface (UI) or a graphical user interface (GUI) related to a call. And when the mobile terminal 100 is in a video call mode or a photographing mode, the display unit 150 displays photographed or received images or a UI and a GUI.

Such display unit 150 may include at least one of a liquid crystal display (LCD), an organic light-emitting diode (OLED), a flexible display, or a 3D display.

The input unit 160 has a configuration for a user to control the object 200, may include a key pad, a dome switch, and a touchpad, and may be embodied as a touch screen integrated with the display unit 150. Hereinafter, an example in which the input unit 160 is embodied as a touch screen will be described, but it is not limited thereto.

For example, the virtual information 20 of the object 200 may include a user interface (UI) or a graphical user interface (GUI) for controlling the object 200. In this case, when the display unit 150 displays the virtual information 20, the user can control the object 200 by touching the UI or the GUI.

When the user controls the object 200 through the input unit 160, the control unit 130 generates a control signal according to the user's input, and the communication unit 120 transmits the control signal for controlling the object 200 to the object 200. Then, the object 200 operates according to the received control signal.

As described above, according to the augmented reality service providing device according to an embodiment of the present invention, even if the position of the object 200 is not entered in advance or indoor spatial learning and so on is not done, the augmented reality service may be provided by calculating the position of the object 200 with more than a certain level of accuracy.

In addition, the augmented reality service providing device according to an embodiment of the present invention may interact with the object 200 through augmented reality, thereby providing an intuitive and efficient user experience to users.

The control unit 130 may label the estimated position of the object on the virtual information 20 of the object 200. Through this, it may be used in various application fields such as indoor navigation, initial response to disasters including fire, and finding lost items.

Figure 3:
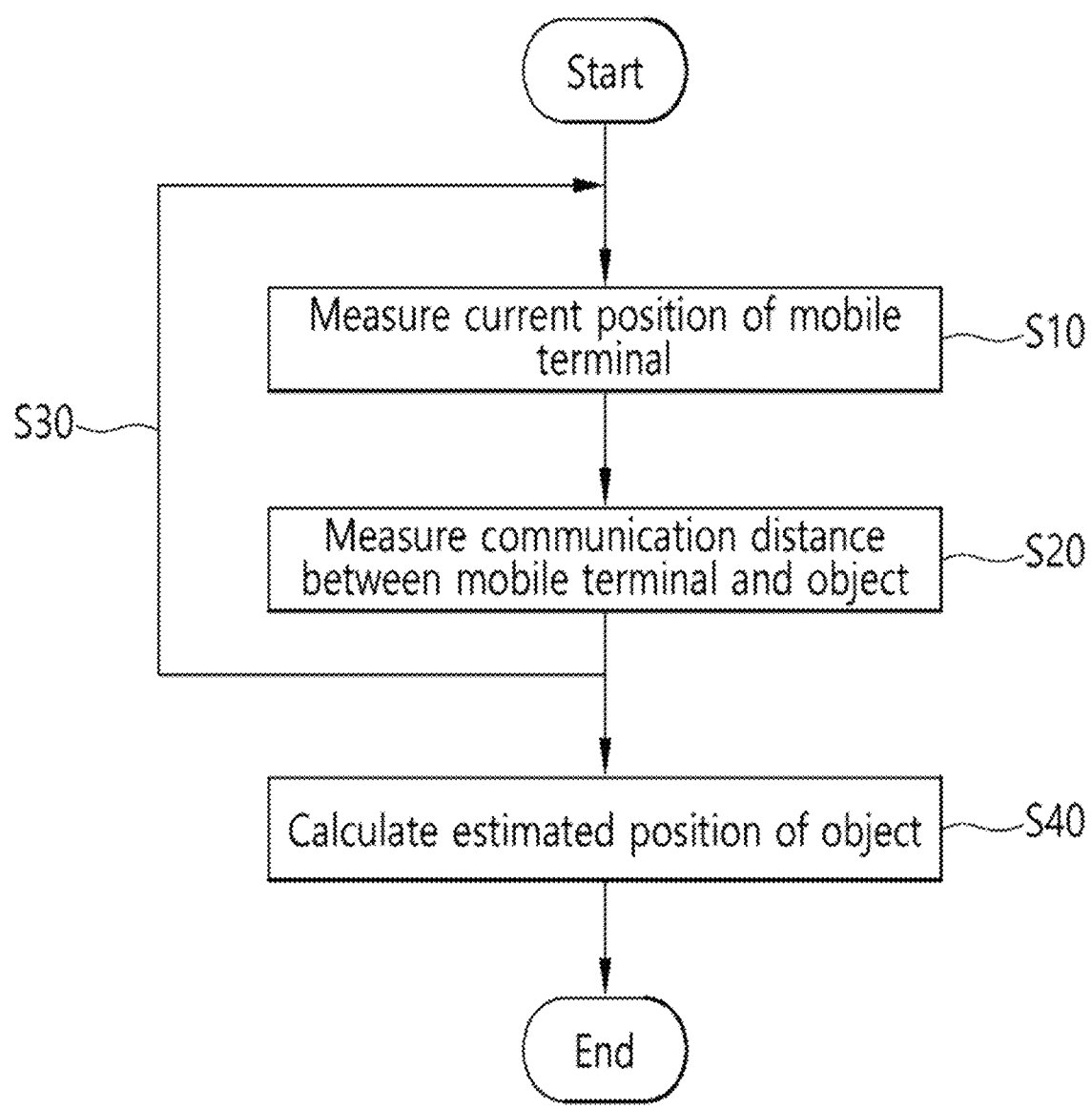
FIG. 3 is a flowchart of an object location measurement method according to an exemplary embodiment of the present invention.

FIG. 3 is a flowchart of an object location measurement method according to an exemplary embodiment of the present invention.

Hereinafter, an object location measurement method according to an embodiment of the present invention will be described with reference to FIGS. 1 to 3, but the same contents as the above-described augmented reality service providing device will be omitted.

The object location measurement method according to an embodiment of the present invention is a method for measuring a position of an object 200 in order to visualize the object 200 in augmented reality.

First, the sensing unit 110 measures a current position of the mobile terminal 100 at step S10, and the communication unit 120 measures a communication distance between the mobile terminal 100 and an object 200 at step S20.

In this case, the current position of the mobile terminal 100 may be measured through Visual Inertial Odometry (VIO). And, the communication distance between the mobile terminal 100 and the object 200 may be measured based on an intensity of a receiving signal received from the object 200.

Next, the control unit 130 control to repeat a plurality of times the measurement of the current position of the mobile terminal 100 and the communication distance between the mobile terminal 100 and the object 200 while the mobile terminal 100 is moving at step S30. In this case, the measurement may be repeated three times to measure 2D position coordinates of the object 200, and 4 times to measure 3D position coordinates of the object 200.

Next, the calculation unit 140 calculates an estimated position of the object 200 based on the current position of the mobile terminal 100 and the communication distance between the mobile terminal 100 and the object 200, measured repeatedly a plurality of times at step S40. In this case, the estimated position of the object 200 may be calculated using the multilateration method.

As described above, according to the object location measurement method according to an embodiment of the present invention, even if the position of the object 200 is not entered in advance or indoor spatial learning and so on is not done, the augmented reality service may be provided by calculating the position of the object 200 with more than a certain level of accuracy.

The object location measurement method according to an embodiment of the present invention described above may be embodied as codes that can be read by a processor in a medium on which a program is recorded. Such examples of medium that can be read by a processor include ROM, RAM, CD-ROM, magnetic tape, floppy disk, optical data storage, etc. and those embodied in the form of carrier wave, for example, transmission over the Internet.

The detailed description above is to discuss embodiments of the present invention. In addition, the description above shows and describes embodiments, and the present invention may be used in various other combinations, modifications, and environments. In other words, changes or modifications are possible within the scope of the concept of the invention disclosed in the present specification, the scope equivalent to the disclosed contents, and/or the scope of the skill or knowledge in the art. The embodiments described above describes conditions for implementing the technical idea of the present invention, and embodiments in another state known in the art in using other inventions like the present invention and various changes required in the specific application and use of the present invention are also possible. Therefore, the above-detailed description of the invention is not intended to limit the present invention to the disclosed embodiments. In addition, the attached claims shall be construed as including other embodiments.

What is claimed is:

1. An augmented reality service providing device, comprising:
    a sensor to photograph an object and to measure a current position of a mobile terminal;
    a communicator to measure a communication distance between the mobile terminal and the object;
    a controller to control to repeat a plurality of times the measurements of the current position and the communication distance while the mobile terminal is moving;
    a calculator to calculate an estimated position of the object based on the current position and the communication distance measured repeatedly the plurality of times; and
    a display to display virtual information on the object on the estimated position of the object,
    wherein the controller generates a plurality of virtual anchors for each predetermined distance when the mobile terminal moves in an indoor space in which the object is located, controls the sensor to measure the current position of the mobile terminal in the plurality of virtual anchors wherein positions of the plurality of virtual anchors change as the mobile terminal moves, and controls the communicator to measure the communication distance between the mobile terminal and the object.

2. The augmented reality service providing device of claim 1, wherein the sensor comprises a camera and an inertial measurer, and measures the current position of the mobile terminal through Visual Inertial Odometry (VIO).

3. The augmented reality service providing device of claim 1, wherein the communicator measures the communication distance based on an intensity of a receiving signal received from the object.

4. The augmented reality service providing device of claim 1, wherein the calculator calculates the estimated position of the object using a multilateration method.

5. The augmented reality service providing device of claim 1, wherein the communicator receives the virtual information from the object and transmits a control signal for controlling the object to the object.

6. The augmented reality service providing device of claim 1, wherein the controller labels the estimated position of the object on the virtual information.

7. The augmented reality service providing device of claim 1, further comprising an input device for a user to control the object.

8. The augmented reality service providing device of claim 7, wherein the controller generates a control signal according to the user's input from the user.

9. An object location measurement method to visualize an object in augmented reality, comprising:
   generating a plurality of virtual anchors for each predetermined distance when a mobile terminal moves in an indoor space in which the object is located;
   controlling a sensor to measure a current position of the mobile terminal in the plurality of virtual anchors wherein positions of the plurality of virtual anchors change as the mobile terminal moves;
   controlling a communicator to measure a communication distance between the mobile terminal and the object;
   measuring the current position of the mobile terminal and the communication distance between the mobile terminal and the object;
   repeating a plurality of times the measurements of the current position and the communication distance while the mobile terminal is moving; and
   calculating an estimated position of the object based on the current position and the communication distance measured repeatedly the plurality of times.

10. The object location measurement method of claim 9, wherein the measuring the current position of the mobile terminal is performed through VIO (Visual Inertial Odometry).

11. The object location measurement method of claim 9, wherein the measuring the communication distance between the mobile terminal and the object is performed by measuring the communication distance based on an intensity of a receiving signal received from the object.

12. The object location measurement method of claim 9, wherein the calculating the estimated position of the object is performed by calculating the estimated position of the object using a multilateration method.

* * * * *